(12) United States Patent
Gray, Jr.

(10) Patent No.: US 6,301,888 B1
(45) Date of Patent: Oct. 16, 2001

(54) LOW EMISSION, DIESEL-CYCLE ENGINE

(75) Inventor: Charles L. Gray, Jr., Pinckney, MI (US)

(73) Assignee: The United States of America as represented by the Administrator of the Environmental Protection Agency, Washington, DC (US)

( * ) Notice: Subject to any disclaimer, the term of this patent is extended or adjusted under 35 U.S.C. 154(b) by 0 days.

(21) Appl. No.: 09/613,140

(22) Filed: Jul. 10, 2000

Related U.S. Application Data

(63) Continuation-in-part of application No. 09/358,398, filed on Jul. 22, 1999, now abandoned.

(51) Int. Cl.[7] .................................................. F02M 25/07
(52) U.S. Cl. .................................... 60/605.2; 123/568.11; 123/698; 123/703
(58) Field of Search ........................... 60/605.2; 123/431, 123/568.12, 698, 568.11, 703

(56) References Cited

U.S. PATENT DOCUMENTS

| | | | |
|---|---|---|---|
| 4,055,158 | * 10/1977 | Marsee | 123/568.12 |
| 5,343,702 | * 9/1994 | Miyajima et al. | 123/431 |
| 5,607,010 | * 3/1997 | Schoenfeld et al. | 60/605.2 |
| 5,778,674 | * 7/1998 | Kimura | 60/605.2 |
| 5,791,146 | * 8/1998 | Dungner | 60/605.2 |
| 5,937,651 | * 8/1999 | Braun et al. | 60/605.2 |
| 6,029,451 | * 2/2000 | Gaertner | 60/605.2 |
| 6,062,026 | * 5/2000 | Woollenweber et al. | 60/605.2 |

FOREIGN PATENT DOCUMENTS

| | | | |
|---|---|---|---|
| 5-71429 | * 3/1993 | (JP) | 60/605.2 |

* cited by examiner

Primary Examiner—Michael Koczo
(74) Attorney, Agent, or Firm—Lorusso & Loud

(57) ABSTRACT

A diesel-cycle engine with a unique exhaust gas recirculation system includes a plurality of cylinders with fuel feed for each of the cylinders and an intake manifold for distributing intake air to each of the cylinders for combustion of the fuel charges therein with generation of exhaust gas. The exhaust gas is discharged to ambient atmosphere through an exhaust line with a gas turbine therein. The gas turbine drives an intake compressor which serves to compress the intake air. An engine controller controls a valve regulating the amount of exhaust gas recirculation responsive to sensed concentration of an exhaust gas component. In another embodiment, an engine controller controls a valve regulating the amount of exhaust gas recirculation, responsive to sensed demand for torque and control of fuel injection quantity is responsive to sensed concentration of an exhaust gas component. An exhaust gas recirculation line recirculates a portion of the collected exhaust gas to the combustion chambers through an exhaust gas cooler which serves to cool the gas and separate out a condensate and particulate matter. A return line leading from the exhaust gas cooler to the exhaust line serves to discharge the separated condensate and particulate matter through the exhaust line to the ambient atmosphere.

32 Claims, 5 Drawing Sheets

LOW EMISSION, DIESEL-CYCLE ENGINE

This application is a Continuation-in-Part of applicants' application U.S. Ser. No. 09/358,398 filed Jul. 22, 1999 abandoned.

BACKGROUND OF THE INVENTION

1. Field of the Invention

The field of the invention is reduction of $NO_x$ and particulate matter (PM) emissions from Diesel-cycle engines. The field of application is primarily in internal combustion engines for motor vehicles.

2. Prior Art

The growing use of Diesel-cycle engines in motor vehicles greatly adds to the atmospheric presence of pollutants such as oxides of nitrogen and particulate matter. Conventional Diesel-cycle engines emit nitrogen oxide ($NO_x$) and particulate matter (PM) substantially in excess of the emissions from Otto-cycle (e.g., gasoline) engines, yet Diesel-cycle engines achieve substantially better fuel economy. Because of the higher fuel economy, Diesel-cycle engines dominate the heavy-duty truck market and much of the off-road commercial vehicle market, with growing penetration into light duty trucks. Thus, technology which could substantially reduce $NO_x$ and PM emissions from Diesel-cycle engines is highly desired.

Two key features of Diesel-cycle engines are the absence of substantial throttling of the intake charge (i.e., air or a mixture of air and recirculated exhaust gas) and the direct injection of fuel into the combustion chamber. A third important feature of most modern Diesel-cycle engines is a turbocharger, usually followed by a charge cooler, to supply pressurized intake charge to allow increased specific power output. The turbocharger usually includes a turbine compressor driven by an exhaust gas turbine expander. During a command for a rapid rise in engine torque, increased fuel can be supplied almost instantaneously. However, if the engine is currently operating with high exhaust gas recirculation (EGR), there is a reduced quantity of oxygen available which will not allow maximum fuel injection without poor combustion and increased PM emissions. Also, until the exhaust energy level is increased to the level associated with the higher torque output, the turbocharger is unable to supply the increased boost pressure (and hence more mass of oxygen) that will ultimately be available at the new equilibrium (commonly called "turbo-lag"), and again a constraint must be placed on the maximum fuel injection quantity until the system responds with an increased mass of oxygen.

With conventional technology, it is especially difficult to quickly adjust the quantity of exhaust gas entering the combustion chamber with the charge air, because: (1) the response time of the EGR flow control valve is relatively long compared to the combustion cycles of the engine, and (2) the time required to "purge" the previously desired exhaust gas and air mixture from the intake system through the engine is also relatively long and may take several combustion cycles before the newly desired mixture can be established.

SUMMARY OF THE INVENTION

Accordingly, an objective of the present invention is provision of an advanced EGR system to minimize $NO_x$ and PM emissions from a Diesel-cycle engine while maintaining or enhancing transient and steady-state performance and durability of such engines.

Another objective of the present invention is to shorten the response time for EGR.

The present invention provides a diesel-cycle engine having a novel exhaust gas recirculation system. More specifically, the present invention is directed to a diesel engine having a plurality of cylinders which define respective combustion chambers therein with fuel feed, e.g. fuel injectors, for feeding successive fuel charges to each of the combustion chambers. An air-intake line receives intake air and feeds it to an intake manifold which distributes the received intake air to the various cylinders for combustion of the fuel charges therein with generation of exhaust gas. A gas turbine is provided in an exhaust line which receives exhaust gas from an exhaust gas manifold which, in turn, collects exhaust gas from the various combustion chambers. An intake compressor, driven by the gas turbine compresses the intake air. A sensor is provided in the exhaust line for sensing concentration of at least one exhaust component in the exhaust gas and an engine controller generates a control signal in accordance with the sensed concentration. A portion of the exhaust gas is recirculated through an exhaust gas recirculation line for feed to the combustion chambers and an exhaust gas cooler is located in the exhaust gas recirculating line for cooling the recirculated portion of the exhaust gas and for separating condensate and particulate matter (PM) therefrom. Optionally, a separate PM filter may be provided in the exhaust gas recirculation line. A return line connects the exhaust gas cooler to the exhaust gas line for discharge of the condensate and particulate matter through the exhaust gas line which vents to the ambient atmosphere. A control valve serves to control flow rate of the recirculated portion of the exhaust gas responsive to the control signal received from the engine controller.

In several preferred embodiments the exhaust gas recirculation line connects the exhaust line, at a point downstream of the turbine, with the air-intake line upstream of the intake-compressor. In another embodiment the exhaust gas recirculation line does not connect with the air-intake line but, rather, delivers exhaust gas, compressed by an auxiliary compressor, to an auxiliary manifold for distribution into the plural cylinders, separate from the intake air introduced through the intake manifold.

Thus, the present invention achieves its objectives by a unique design and means of operation which maintains closed loop control of the fuel injection quantity and/or the EGR quantity. The closed loop control is achieved by measuring a component (or components) of the exhaust (or intake) that correlates well to the level of $NO_x$ and/or PM, and by adjusting the fuel quantity injected and/or the quantity of EGR accordingly, to minimize the formation of $NO_x$ and PM emissions. The measured components may include but are not limited to oxygen ($O_2$), $NO_x$ and/or PM directly, and/or carbon dioxide ($CO_2$). The goal is to use as much EGR as possible for the torque being commanded, and to control the fuel injection quantity to minimize PM formation, especially during engine transients.

The present invention quickly adjusts the quantity of exhaust gas entering the combustion chambers. In one embodiment, a quick EGR response is achieved by providing a separate exhaust gas intake manifold with ports near the combustion chamber intake valves, and thus the delay is only associated with the response of the EGR valve. In another embodiment a quick EGR response is achieved by providing a separate air-only intake manifold with ports near the combustion chamber intake valves and a fast response compressor which provides a pressurized air flow to displace some or all of the in-place air/EGR mixture, thus providing reduced emissions while improving the engine torque rise rate and engine performance.

EGR can be achieved by taking the exhaust gas from the exhaust pipe before the turbocharger turbine expander (called a high pressure system, and this is the most common approach) or after the expander (the low pressure system). There are advantages and disadvantages of both approaches. The low pressure system has advantages of: (1) receiving a lower temperature exhaust gas, (2) simplified control valve, (3) less detrimental impact on the turbocharger performance, and (4) good mixing of the EGR and air. The concerns with current low pressure systems are: (1) slower EGR response time (more intake gas volume to purge), (2) the EGR must be pumped back to a high enough pressure so that it will flow into the pressurized intake, (3) exhaust fouling of the pump (whether the pump is the turbocharger compressor or a separate pump), (4) lower efficiency of the pump because of the higher temperature of exhaust gas as compared to that of ambient air, and (5) the fouling of the charge air cooler. The high pressure system has advantages of: (1) faster EGR response time, (2) no pump/compressor or charge air cooler fouling, (3) a separate EGR cooler can be maintained at a higher temperature than the charge air cooler to minimize the fouling due to condensate, and (4) a generally simpler hardware approach. The concerns with high pressure systems include: (1) more difficult air and EGR mixing, (2) higher final charge gas temperature and therefore lower efficiency and higher $NO_x$, (3) detrimental impact on the turbocharger system, and (4) the EGR control valve is at a higher temperature and is more complex.

The EGR design of the preferred embodiments of the invention is of the low pressure system type, but several unique new features mitigate the previously identified concerns. First, the system has a very fast response. The EGR pump is driven by the turbocharger turbine expander, and may be either a second compressor wheel or the existing air intake compressor, since the power available from the turbine expander (turbine) is not diminished by removing high pressure exhaust gas.

In the present invention the fouling of the pump and charge air cooler (or separate EGR cooler) and the reduced efficiency of the pump are mitigated by a new design which takes the EGR from a point downstream of the turbine to make use of normal exhaust gas cooling, returns the exhaust gas to a location near the pump with the return tubing serving to further cool the EGR, and routes the partially cooled EGR through a separate cooler to cool the EGR and remove condensate and other fouling material before being fed at near ambient air temperature to the EGR pump. The condensate and removed fouling material flow back into the hot exhaust gas stream to be exhausted to the ambient atmosphere.

DESCRIPTION OF THE PREFERRED EMBODIMENTS

Figure 1:
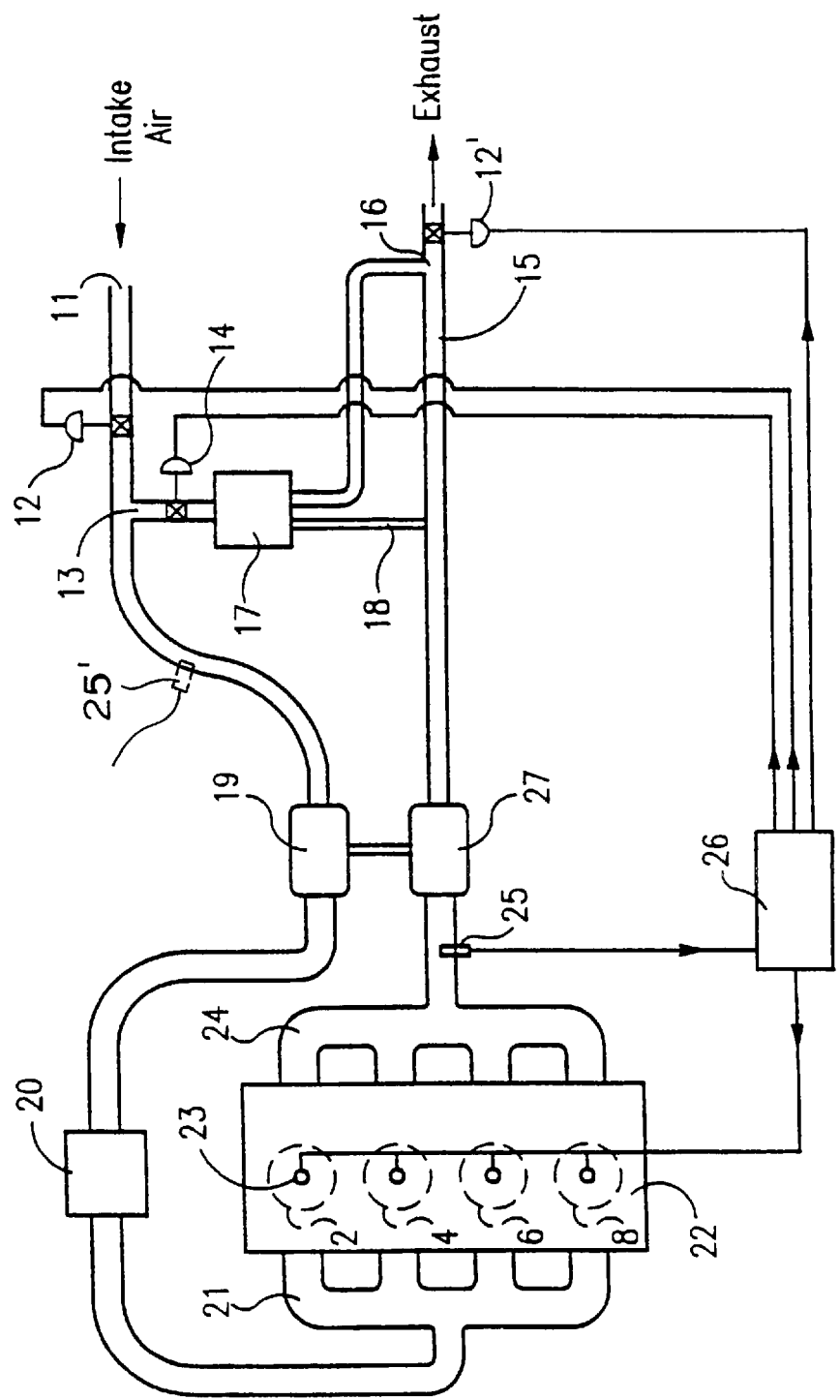
FIG. 1 is a schematic view of a first preferred embodiment of the present invention showing a diesel engine and the exhaust, air-intake and EGR systems associated therewith.

FIG. 1 shows the basic features of a first preferred embodiment of the present invention. As shown in FIG. 1, intake air enters through intake port 11 and flows through a fast intake air flow control valve 12. EGR enters the air stream at EGR intake port 13. Valve 12 is used to restrict the flow of incoming air thereby creating a reduced pressure at EGR intake port 13. Exhaust gas then flows into the intake air stream at a rate depending on the restriction imposed by valve 12. Therefore, valve 12 in effect becomes the primary EGR flow control valve by its control of intake air flow rate. Alternatively, or in combination with valve 12, a fast exhaust gas flow control valve 12' is used to restrict the flow of exhaust gas thereby creating an increased pressure of exhaust gas at port 13. Optional EGR flow control valve (cutoff valve) 14 can be used to quickly terminate EGR flow when high engine torque is commanded. Both valves 12 and 14 are intentionally located in a cool and clean gas flow to reduce their cost and improve their reliability and durability. EGR is taken from the engine exhaust pipe 15 at port 16 and flows through the EGR cooler 17 (optionally having an integrated reflux condenser/scrubber design). Condensate from cooler 17 flows back to the exhaust pipe through condensate return tube (return line) 18, along with collected PM. The air and EGR mixture then flows through compressor 19, through the charge air cooler 20 and into a conventional intake manifold 21 of engine 22. In this most basic configuration, the volume of the intake ports (not shown) is minimized to reduce the transient EGR response, i.e., to minimize the intake volume that must be purged when a different EGR concentration is needed by the engine. The intake charge enters the engine combustion chambers within cylinders 2, 4, 6 and 8, is compressed, fuel is injected by fuel injectors 23, combustion and expansion occurs, and the exhaust gases are expelled into the engine exhaust manifold 24. An exhaust component sensor 25 (a wide range oxygen sensor in the preferred embodiment) senses the concentration of a reference exhaust gas component and sends its signal to engine controller 26. The engine controller (with input signals from other engine sensors such as engine speed, engine torque command, boost pressure, etc., none shown) sends commands to the fuel injectors 23 and valves 12 and 14 (and optionally to valve 12') to provide closed loop control of EGR and/or fuel injection rate. The exhaust gas is then expanded through the turbocharger turbine expander 27 and flows out through the exhaust pipe 15 to the ambient atmosphere. An exhaust sensor 25 may be installed in each cylinder exhaust port to provide the option of controlling the fuel injection rate individually for each cylinder.

The exhaust sensor 25 may be located in exhaust pipe 15 or, optionally, in air intake line 10 downstream of EGR intake port 13 as indicated by 25' in FIG. 1.

Figure 2:
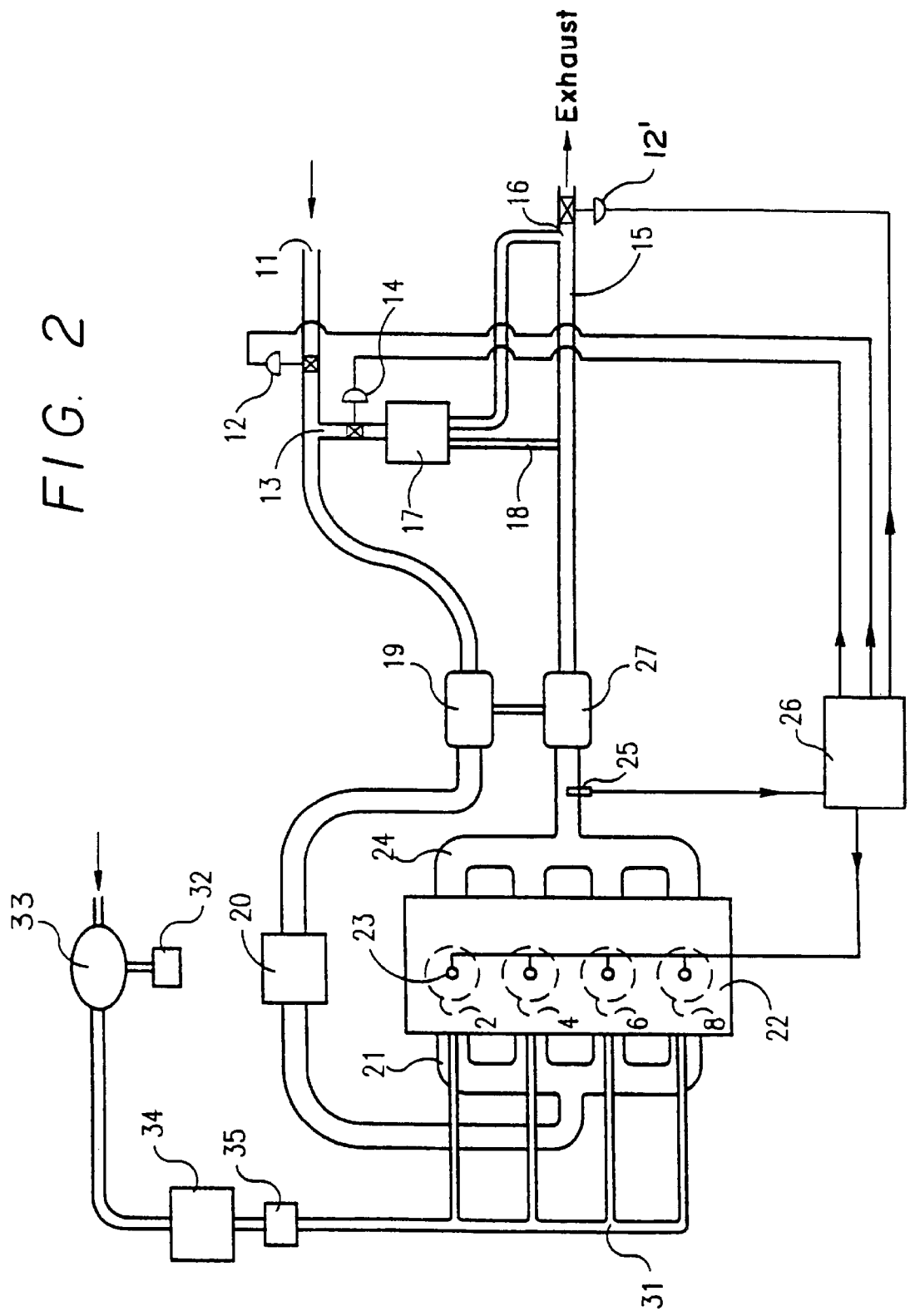
FIG. 2 is a schematic view of a second preferred embodiment of the present invention showing a diesel engine and the exhaust, air-intake and EGR systems associated therewith.

A second preferred embodiment of the present invention is shown in FIG. 2. In order to provide for a very rapid torque rise capability, a separate, additional air intake manifold 31 is provided which delivers compressed air to the intake port of each of cylinders 2, 4, 6 and 8. When a rapid torque rise is commanded, a fast response motor 32 (hydraulic, electric or clutched to the engine) activates fast response compressor 33, and compressed air flows through optional charge air cooler 34, through check valve 35, to intake manifold 31. This fast response compressed air displaces some or all of the air/EGR mixture at the inlet to the combustion chamber in base intake manifold 21 thus providing increased oxygen mass to the combustion chamber which allows an increased fuel injection rate and engine torque rise without adversely affecting emissions. When the engine turbocharger turbine expander 27 has responded to the new engine operating condition, motor 32 is disengaged and check valve 35 prevents the pressurized intake charge from flowing through the inactive fast response compressor 33 to the ambient atmosphere.

Figure 3:
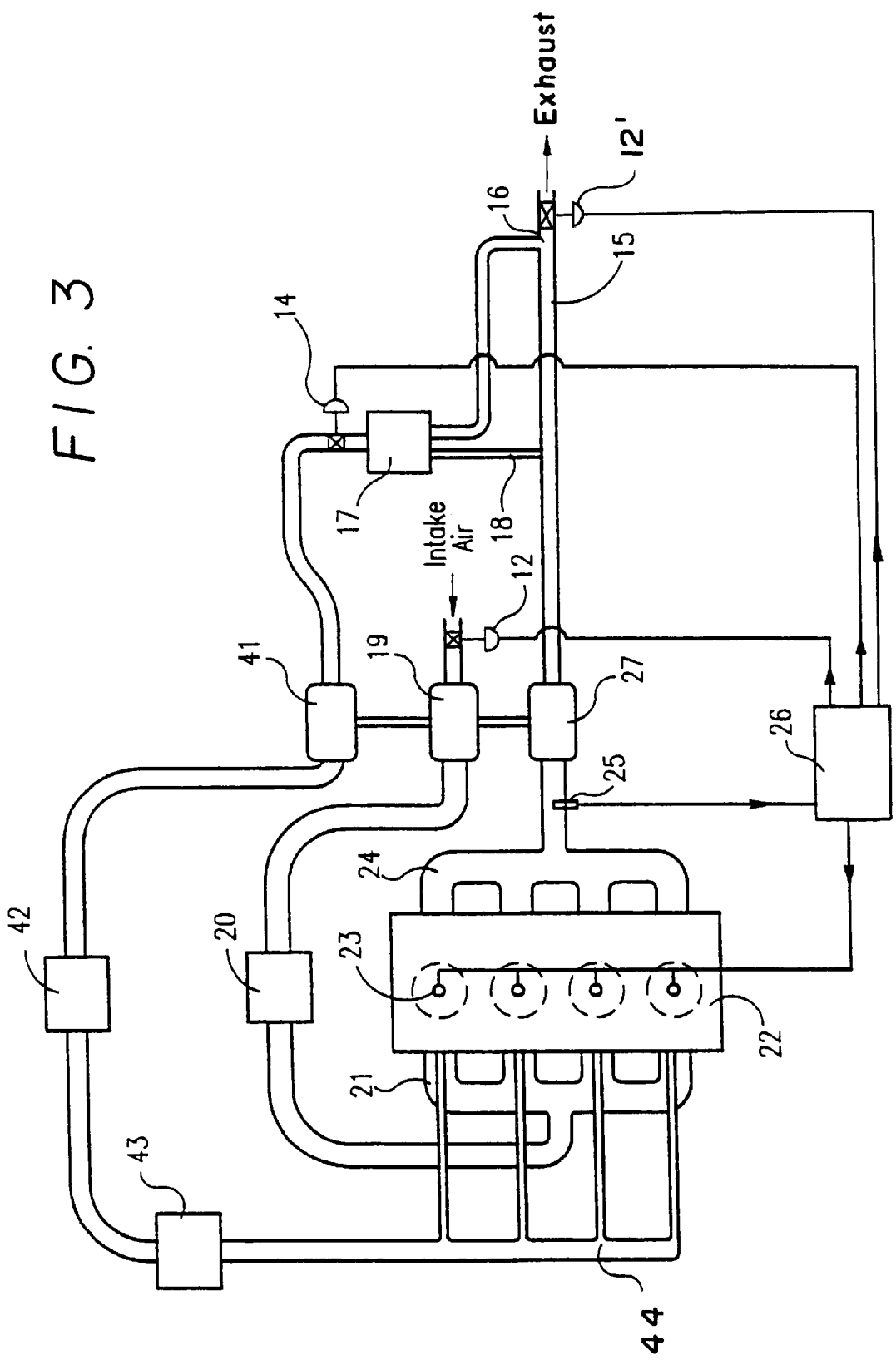
FIG. 3 is a schematic view of a third preferred embodiment of the present invention showing a diesel engine and the exhaust, air-intake and EGR systems associated therewith.

FIG. 3 shows a third preferred embodiment of the present invention. In this third embodiment only air is provided to the first compressor 19 through intake air control valve 12 and is provided to the conventional intake manifold 21. A second (auxiliary) compressor 41 is added to the drive shaft of the turbocharger expander 27. Compressor 41 is an EGR pump and receives exhaust gas through EGR flow control valve 14 from the engine exhaust in a manner like previously described. The exhaust gas flows through an optional auxiliary cooler 42, through a check valve 43, to a separate intake manifold (auxiliary manifold) 44. Auxiliary Manifold 44 delivers EGR directly to the engine intake ports (not shown). In response to commands for changes in the concentration of EGR, the quantity of EGR supplied can rapidly be changed as the flow is shifted between the two compressors 19 and 41.

Figure 4:
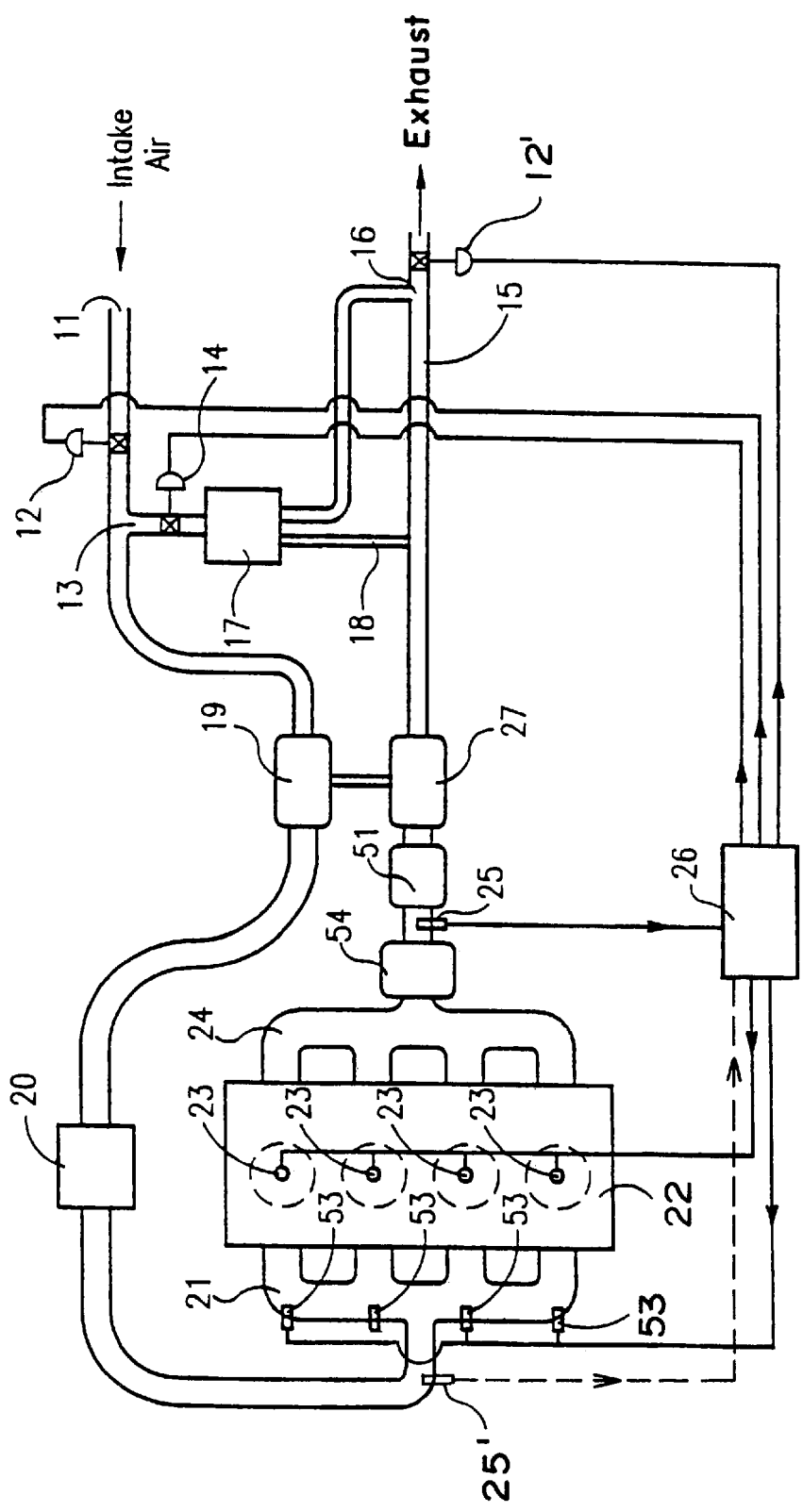
FIG. 4 is a schematic view of a fourth preferred embodiment of the present invention showing a diesel engine and the exhaust, air-intake and EGR systems associated therewith.

In a fourth preferred embodiment shown in FIG. 4, a PM trap oxidizer 54 is located within or after exhaust manifold 24 to filter the engine-produced PM, and because of its high temperature due to its location near the engine exhaust valves, collected PM is near-continuously oxidized (i.e., burned). An exhaust 3-way catalyst 51 is located in the engine exhaust, either before the turbine 27 (as shown) or after turbine 27, depending on space and temperature constraints. In this embodiment, engine controller 26 receives an input signal from exhaust sensor 25 (an oxygen sensor in this preferred embodiment) and sends commands to the fuel injectors 23, and alternatively or in combination with fuel injectors 23, to low pressure port fuel injectors 53, to maintain a stoichiometric air/fuel mixture so as to enable 3-way catalyst 51 to simultaneously oxidize unburned fuel and carbon monoxide while reducing oxides of nitrogen emissions. The exhaust sensor may be located either in exhaust pipe 15 indicated as 25 in FIG. 4 or in the intake air line 11 (or air intake manifold 21) indicated as 25' in FIG. 4. In the latter configuration the exhaust component(s) sensed is from the recirculated exhaust gas. The load produced by the engine (e.g., torque) is varied while maintaining a stoichiometric air/fuel mixture by changing the available oxygen in the charge air, preferably by changing the percent of EGR or optionally by changing the flow of ambient air by adjusting valve 12. A PM trap oxidizer used in combination with a 3-way catalyst and near-stoichiometric engine operation insures low PM emissions (and avoids PM contamination of the catalyst) while achieving low $NO_x$ emissions.

Figure 5:
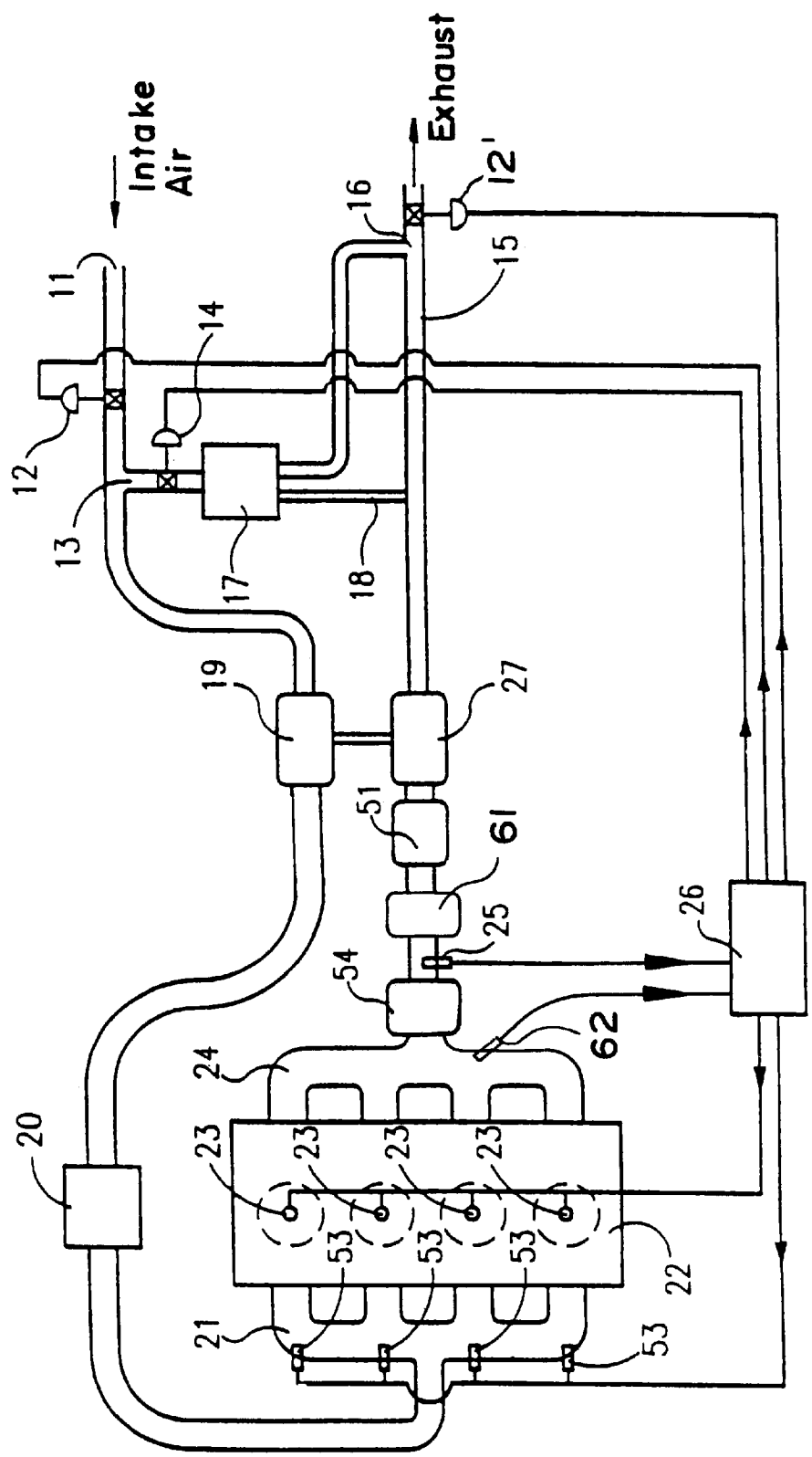
FIG. 5 is a schematic view of a fifth preferred embodiment of the present invention showing a diesel engine and the exhaust air-intake and EGR systems associated therewith.

In a fifth preferred embodiment shown in FIG. 5, an $NO_x$ absorber 61 is located between PM trap oxidizer 54 and catalyst 51. In this embodiment, engine controller 26 performs as described for the fourth preferred embodiment except that it also receives an input signal from exhaust sensor 62 (a pressure sensor in this preferred embodiment) which is correlated to the PM loading on the PM trap oxidizer, and engine controller 26 sends commands to fuel injectors 23 and/or 53 and the EGR flow control valve(s) 12, 12' and/or 14 to provide periodic lean excursions (i.e., excess oxygen) so that the collected PM will readily oxidize and reduce the PM loading. During the period of the lean excursion, $NO_x$ is adsorbed in the $NO_x$ absorber. When the excess PM loading is eliminated, the engine controller 26 returns the system to stoichiometric operation which causes the adsorbed $NO_x$ to be released from $NO_x$ absorber 61, and the released $NO_x$ is reduced as it flows through catalyst 51.

The invention may be embodied in other specific forms without departing from the spirit or essential characteristics thereof. For example, the Diesel-cycle engine (also called diesel engine) described may use a variety of fuels (including conventional diesel and gasoline fuels) and can function equally well with or without turbochargers (whether one or more stages of boost, e.g., two turbochargers in series) or other change in boost systems. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A diesel-cycle engine comprising:
   a plurality of cylinders, each cylinder providing a combustion chamber;
   fuel feed means for feeding successive fuel charges to each of said combustion chambers;
   an air intake line and an intake manifold for receiving intake air through said air intake line and for distributing the received intake air to the cylinders for combustion of the fuel charges therein with generation of exhaust gas;
   an exhaust gas manifold for collecting exhaust gas from the cylinders and for discharging the collected exhaust gas to ambient atmosphere through an exhaust line;
   an exhaust component sensor for sensing concentration of at least one exhaust component in the exhaust gas;
   an engine controller for generating control signals in accordance with the sensed concentration;
   an exhaust gas recirculation line for recirculating a portion of the collected exhaust gas to the combustion chambers;
   an exhaust gas cooler, located in said exhaust gas recirculation line, for cooling the recirculated portion of the exhaust gas and for separating a condensate and particulate matter therefrom;
   a return line connecting said exhaust gas cooler to said exhaust line for discharge of the condensate and particulate matter through said exhaust line; and
   a control valve for controlling flow rate of the recirculated portion of the exhaust gas responsive to the control signals, thereby providing closed loop control of amount of exhaust gas recirculation responsive to the sensed concentration of the at least one exhaust gas component.

2. A diesel-cycle engine according to claim 1 further comprising:
   a turbine in said exhaust line; and
   an intake compressor, driven by said turbine, for compressing the intake air.

3. A diesel-cycle engine according to claim 1 wherein said exhaust component sensor is located in the intake air line for sensing the at least one exhaust component introduced into the intake air through said exhaust gas recirculation line.

4. A diesel-cycle engine according to claim 1, wherein said control valve is located in said exhaust line downstream of a point where said exhaust gas recirculation line connects with said exhaust line.

5. A diesel-cycle engine according to claim 1 additionally comprising a cut-off valve located in said exhaust gas recirculation line, between said exhaust gas cooler and said air intake line.

6. A diesel-cycle engine according to claim 2 wherein said exhaust gas recirculation line connects said exhaust line, downstream of said turbine, with said air intake line upstream of said intake compressor.

7. A diesel-cycle engine according to claim 6, wherein said control valve is located in said exhaust line downstream of a point where said exhaust gas recirculation line connects with said exhaust line.

8. A diesel-cycle engine according to claim 7 additionally comprising a cut-off valve located in said exhaust gas recirculation line, between said exhaust gas cooler and said air intake line.

9. A diesel-cycle engine according to claim 6 wherein said control valve is located in said air intake line upstream of a point where said exhaust gas recirculation line joins said air intake line.

10. A diesel-cycle engine according to claim 9 additionally comprising a cut-off valve located in said exhaust gas recirculation line, between said exhaust gas cooler and said air intake line.

11. A diesel-cycle engine according to claim 1 further comprising:
an air charge cooler located in said air intake line between said intake manifold and said intake compressor.

12. A diesel-cycle engine according to claim 1 additionally comprising:
a supplemental air feed line and a supplemental air manifold for receiving supplemental air from said supplemental air feed line and for distributing the supplemental air to the plural cylinders; and
a fast response compressor located in said supplemental air feed line and a fast response motor for driving said fast response compressor.

13. A diesel-cycle engine according to claim 12 further comprising:
an air cooler in said supplemental air feed line.

14. A diesel-cycle engine according to claim 2 additionally comprising:
a supplemental air feed line and a supplemental air manifold for receiving supplemental air from said supplemental air feed line and for distributing the supplemental air to the plural cylinders; and
a fast response compressor located in said supplemental air feed line and a fast response motor for driving said fast response compressor.

15. A diesel-cycle engine according to claim 14 wherein said exhaust gas recirculation line connects said exhaust line, downstream of said turbine, with said air intake line upstream of said intake compressor.

16. A diesel-cycle engine according to claim 15 wherein said control valve is located in said air intake line upstream of a point where said exhaust gas recirculation line joins said air intake line.

17. A diesel-cycle engine according to claim 14 additionally comprising a cut-off valve located in said exhaust gas recirculation line, between said exhaust gas cooler and said air intake line.

18. A diesel-cycle engine according to claim 1 further comprising:
an auxiliary compressor, driven by said turbine, for compressing the recirculated exhaust gas; and
an auxiliary manifold for receiving the recirculated, compressed exhaust gas and for distributing it to the plural cylinders.

19. A diesel-cycle engine according to claim 18 wherein said exhaust gas recirculation line connects with said exhaust line downstream of said turbine and wherein said control valve is located in said exhaust gas recirculation line between said exhaust gas cooler and said auxiliary compressor.

20. A diesel-cycle engine according to claim 18 further comprising an auxiliary cooler located in said exhaust gas recirculation line between said auxiliary compressor and said auxiliary manifold.

21. A diesel-cycle engine according to claim 1 wherein:
said fuel feed means includes plural fuel injectors, one of said fuel injectors being associated with each of said cylinders; and
said engine controller receives a torque command signal, sets the control signals in accordance with the torque command signal and the sensed concentration to provide maximum exhaust gas recirculation consistent with torque command, and controls the plural fuel injectors to minimize formation of particulate matter in the exhaust gas.

22. A diesel-cycle engine according to claim 12 wherein:
said fuel feed means includes plural fuel injectors, one of said fuel injectors being associated with each of said cylinders; and
said engine controller receives a torque command signal, sets the control signals in accordance with the torque command signal and the sensed concentration to provide maximum exhaust gas recirculation consistent with torque command, and controls the plural fuel injectors to minimize formation of particulate matter in the exhaust gas.

23. A diesel-cycle engine according to claim 18 wherein:
said fuel feed means includes plural fuel injectors, one of said fuel injectors being associated with each of said cylinders; and
said engine controller receives a torque command signal, sets the control signals in accordance with the torque command signal and the sensed concentration to provide maximum exhaust gas recirculation consistent with torque command, and controls the plural fuel injectors to minimize formation of particulate matter in the exhaust gas.

24. A diesel-cycle engine according to claim 1 additionally comprising:
a particulate matter trap oxidizer for removing particulate matter from the collected exhaust gas and for oxidizing the removed particulate matter; and
a catalytic convertor for oxidizing unburned fuel and carbon monoxide and for reducing nitrogen oxides.

25. A diesel-cycle engine according to claim 24 wherein said particulate matter trap oxidizer is located between said exhaust gas manifold and said turbine and said catalytic converter is located between said particulate matter trap oxidizer and said turbine.

26. A diesel-cycle engine according to claim 24 additionally comprising low pressure port fuel injectors mounted in said intake manifold, said low pressure port fuel injectors operating under control of said control signals to maintain a stoichiometric air/fuel mixture enabling said catalytic converter to simultaneously oxidize unburned fuel and carbon monoxide while reducing oxides of nitrogen.

27. A diesel-cycle engine according to claim 24 wherein said engine controller maintains stoichiometric or near-stoichiometric engine operation.

28. A diesel-cycle engine according to claim 27, further comprising a NOx adsorber located between said particulate trap oxidizer and said catalytic converter and wherein said engine controller provides a periodic lean excursion to enhance collected particulate matter oxidation, and during such lean excursion the NOx adsorber collects and stores NOx which is then released and reduced within the catalyst when the lean excursion is complete.

29. A diesel-cycle engine according to claim 24 further comprising a NOx adsorber located between said particulate trap oxidizer and said catalytic converter and wherein said engine controller provides a periodic lean excursion to enhance collected particulate matter oxidation, and during such lean excursion the NOx adsorber collects and stores NOx which is then released and reduced within the catalyst when the lean excursion is complete.

30. A diesel-cycle engine according to claim 1 wherein said control valve is located in said air intake line upstream of a point where said exhaust gas recirculation line joins said air intake line and further comprising another control valve for regulating exhaust gas recirculation responsive to the sensed concentration, said another control valve being located in said exhaust line.

31. A diesel-cycle engine according to claim 1 wherein said fuel feed means is a plurality of fuel injectors individually associated with said cylinders, and wherein said fuel injectors are controlled by said control signals, thereby providing closed loop control of fuel injection responsive to the sensed concentration of the at least one exhaust gas component.

32. A diesel-cycle engine according to claim 18 wherein:
  said engine controller receives a torque command signal, sets the control signals in accordance with the torque command signal and the sensed concentration to provide maximum exhaust gas recirculation consistent with torque command, and controls the plural fuel injectors to minimize formation of particulate matter in the exhaust gas.

* * * * *